(12) United States Patent
Kurita et al.

(10) Patent No.: US 7,731,281 B2
(45) Date of Patent: Jun. 8, 2010

(54) VEHICLE SEAT

(75) Inventors: Makoto Kurita, Saitama (JP); Koji Uno, Saitama (JP); Yukio Hiruta, Saitama (JP); Yoshiaki Morita, Aichi (JP); Masaru Ueda, Aichi (JP); Nobukatsu Masuda, Aichi (JP); Hideyuki Kito, Aichi (JP)

(73) Assignees: Honda Motor Co., Ltd., Tokyo (JP); Imasen Electric Industrial Co., Ltd., Aichi (JP)

( * ) Notice: Subject to any disclaimer, the term of this patent is extended or adjusted under 35 U.S.C. 154(b) by 456 days.

(21) Appl. No.: 11/804,894

(22) Filed: May 21, 2007

(65) Prior Publication Data
US 2007/0273186 A1     Nov. 29, 2007

(30) Foreign Application Priority Data
May 22, 2006    (JP)    ............... P. 2006-142030

(51) Int. Cl.
*B60R 21/00*    (2006.01)
(52) U.S. Cl. .................. 297/216.19; 296/68.1; 248/429
(58) Field of Classification Search ............ 297/216.18, 297/216.19; 248/429; 296/68.1
See application file for complete search history.

(56) References Cited

U.S. PATENT DOCUMENTS 3,578,376 A * 5/1971 Hasegawa et al. .......... 296/68.1
3,669,397 A * 6/1972 Le Mire .............. 297/216.19 X
5,967,604 A 10/1999 Yoshida et al.

FOREIGN PATENT DOCUMENTS

| JP | 62-161081 | 10/1987 |
| JP | 63-154366 | 10/1988 |
| JP | 4356240 | 12/1992 |
| JP | 07-304356 | 11/1995 |
| JP | 08-040125 | 2/1996 |
| JP | 10-175469 | 6/1998 |
| JP | 11-005468 | 1/1999 |
| JP | 2001-063430 | 3/2001 |
| JP | 2001-260726 | 9/2001 |
| JP | 2002-539011 | 11/2002 |

\* cited by examiner

*Primary Examiner*—Anthony D Barfield
(74) *Attorney, Agent, or Firm*—Carrier, Blackman & Associates, P.C.; Joseph P. Carrier; William D. Blackman

(57) ABSTRACT

An impact absorbing plate 31 is disposed between a front part 31z of the impact absorbing plate 31 and a vehicle body 11 so that a rupture generating part 44 ruptured by impact is extended in the front and rear direction of the vehicle, and the impact absorbing plate 31 is fixed to a front part 13a and a rear part 13b of the front seat bracket 13 provided in the vehicle body by rivets 33 and 33. A portion of front part 31z of the impact absorbing plate 31 is cut to form a cutoff part 45, and a front end 17a of a rail 17 provided in a seat section is attached to a convex part 35, which is molded so as to expand upward an inner side of the cutoff part 45, by a rivet 34.

14 Claims, 10 Drawing Sheets

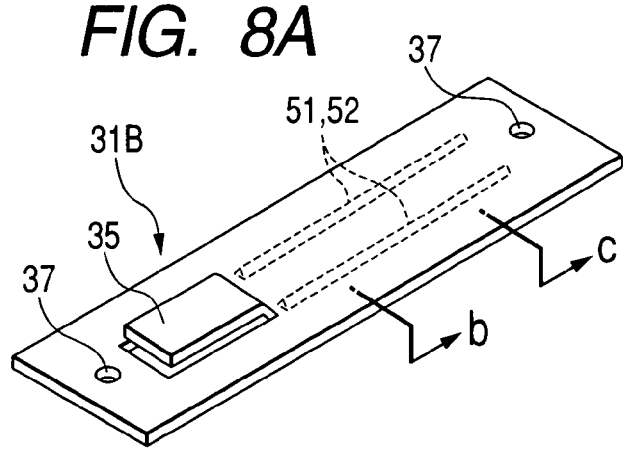
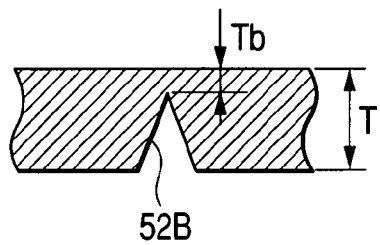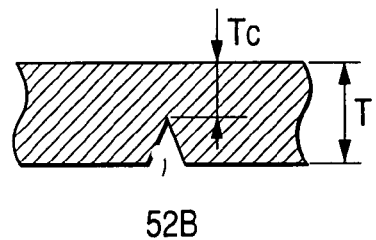
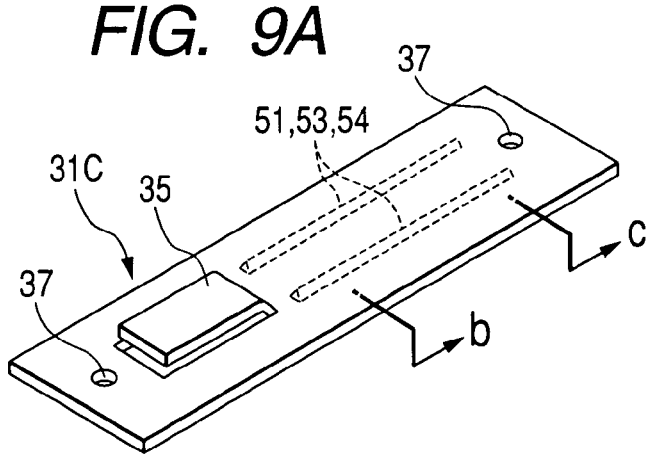
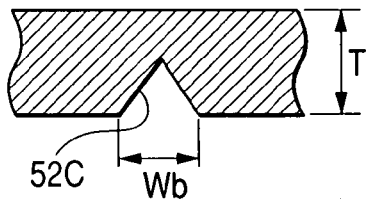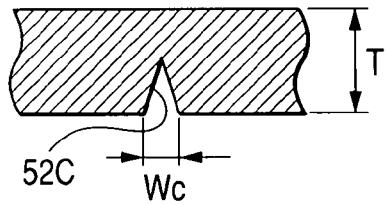

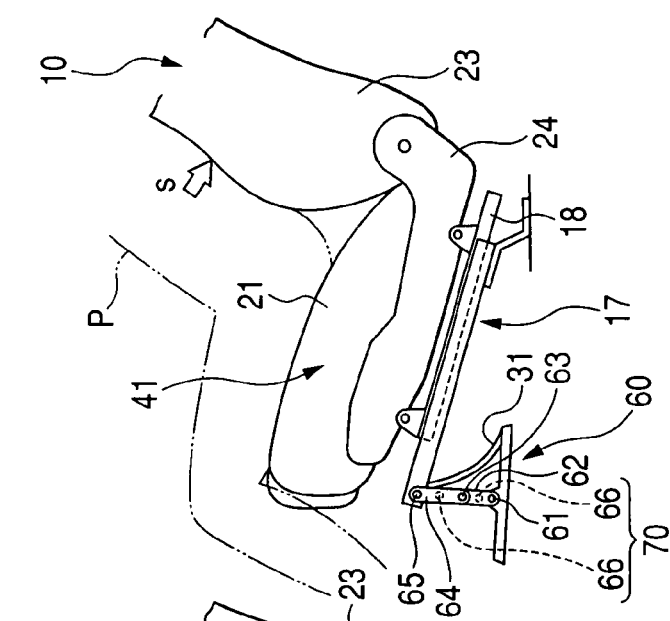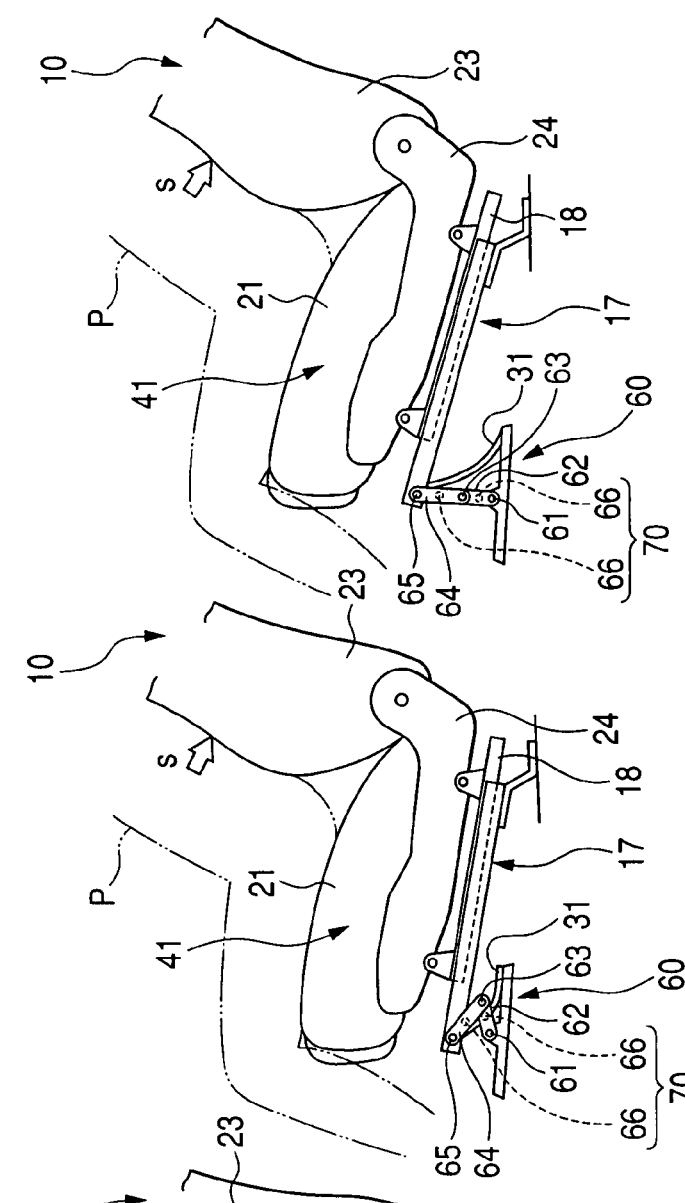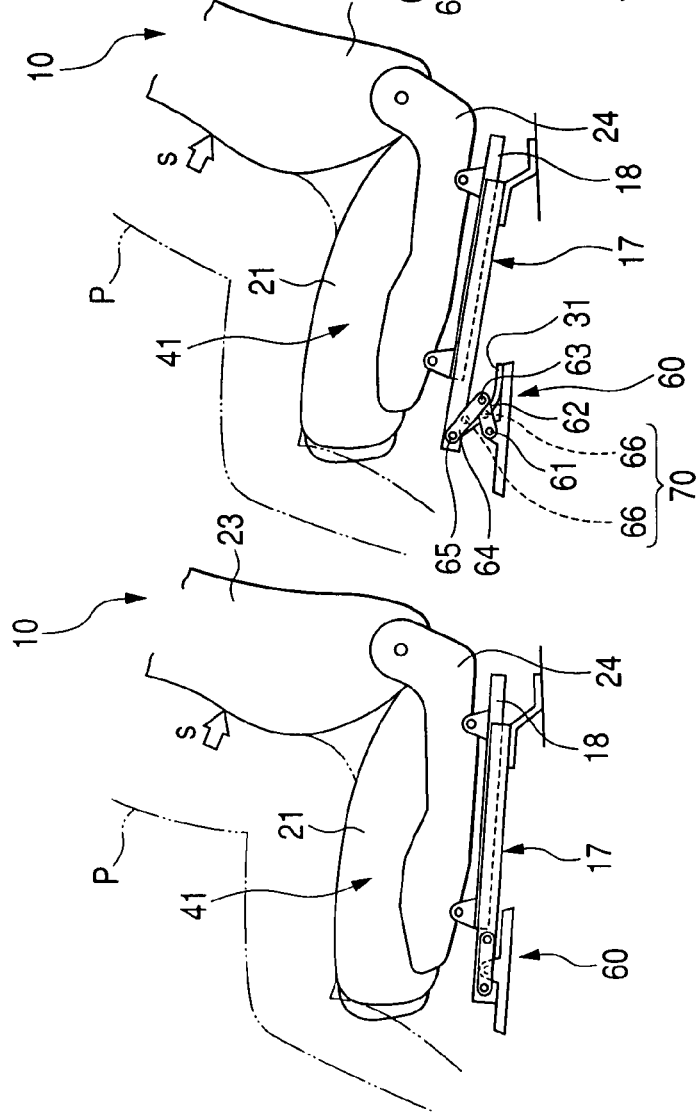

VEHICLE SEAT

BACKGROUND OF THE INVENTION

The present invention relates to a vehicle seat provided with an impact absorbing plate for absorbing impact while being ruptured when a force of a specified level or higher is applied.

It is proposed (for example, see Patent Document 1) that a vehicle seat is provided with an impact absorbing plate for absorbing impact while being ruptured when a force of a specified level or higher is applied. The above-mentioned vehicle seat has a seat section that is connected to a vehicle body through the impact absorbing plate.

[Patent Document 1]
Japanese Unexamined Patent Publication No. 2001-260726 (FIG. 5)

Patent Document 1 will be described with reference to the following drawing.

FIG. 13 is a view explaining a basic structure of the related art vehicle seat and shows one side of a seat mount that is disposed between a vehicle body and a vehicle seat to support right and left sides of the vehicle seat.

The seat mount 100 includes a seat bracket 101 that is fixed to the vehicle body, a rail 103 that is disposed at an upper surface 102u of the seat bracket 101, a rail upper 110 that is slidably provided in the rail 103, and a impact absorbing plates 104F and 104R that are fixed to a lower surface of the seat bracket 101 by welding. In addition, a seat section is attached to the rail upper 110.

Through holes 103h and 103h are provided at a front part and a rear part of the rail 103, slots 101f and 101r are provided at the front and rear parts of the upper surface 102u of the seat bracket 101, and through holes 104h and 104h are provided at the impact absorbing plates 104F and 104R. A bolt 105 is passed into the through holes 103h, 101f, and 104h, and the passed bolt is threaded with a nut 106 from a downward of the impact absorbing plate 104F. Furthermore, the bolt 105 is passed into the through holes 103h, 101r, and 104h, and the passed bolt is threaded with the nut 106.

Moreover, when impact load is applied to the impact absorbing plates 104F and 104R so as to direct from the front to the rear, the impact absorbing plates 104F and 104R are ruptured by the bolts 105 and 105 to absorb the impact.

However, since the impact absorbing plates 104F and 104R are ruptured to absorb the impact in Patent Document 1, for example, the dimension of the through holes 104h and 104h or the bolts 105 and 105 provided in the impact absorbing plates 104F and 104R should severely be managed. In addition, the assembly management such as a lockup torque of the bolts is required. Therefore, to stabilize the rupture due to the impact load, complex management in manufacturing is required.

It is preferable to perform simply and stably the control of the impact load.

SUMMARY OF THE INVENTION

It is an advantage of the invention to provide a vehicle seat that performs simply and stably the control of impact load.

According to an aspect of the invention, there is provided a vehicle seat (10) comprising:

a seat section (41), and an impact absorbing plate (31) that absorbs impact while being ruptured, when an upward force of a specified level or higher is applied to the seat section (41), wherein the impact absorbing plate (31) includes a fragile part (51) that is extended in the front and rear direction of a vehicle, and is provided at a lower part in a front end (41a) of the seat section (41), a rear part of the impact absorbing plate is connected to a vehicle body (11), and a front part (31z) of the impact absorbing plate is connected to the front end of the seat section (41).

Preferably, the impact absorbing plate (31) includes two fragile parts (51) that are approximately in parallel with each other, and a cutoff part (45) continuous with the fragile parts is formed at a front end of the fragile parts (51).

Preferably, a convex part (35) is formed at an upper side of the cutoff part (45), and the convex part (35) is connected to the seat section (41).

Preferably, a load supporting part (47) for supporting load of the seat section (41) is provided at a lower side of the convex part (35).

Preferably, the fragile part (51) is a groove (53) having an unequal sectional-area varying in the front and rear direction of the vehicle (11).

Preferably, a width of the groove (53) having the unequal sectional-area becomes narrow toward the rear side of the vehicle (11).

Preferably, the groove (53) having the unequal sectional-area becomes shallow toward the rear side of the vehicle (11).

Preferably, a stopper member (32) prevents the front end (41a) of the seat section (41) from rising higher than a predetermined height.

Preferably, the stopper member (32) is a link mechanism (60) that is folded, when the impact is not generated.

Preferably, the link mechanism (60) includes a plurality of link pieces (62, 64) and is provided with a resistance part (70) serving as resistance when the plurality of the link pieces (62, 64) is elongated.

Preferably, the fragile part (51) is provided at a lower side of the impact absorbing plate (31).

Preferably, the fragile part (51) is made of a plurality of concave parts that are extended in the front and rear direction to be linearly disposed.

Preferably, a site between two fragile parts (51), which are approximately in parallel with each other, in the impact absorbing plate (31) is connected to the front end (41a) of the seat section (41), and a front side and a rear side of the fragile parts (51) are connected to the vehicle body (11).

According to first, eleventh, twelfth and thirteenth aspects of the invention, the impact absorbing plate has a fragile part that is extended in the front and rear direction, a rear part of the impact absorbing plate is connected to the vehicle body, and a front part of the impact absorbing plate is the seat section.

When the vehicle seat receives the impact, the impact absorbing plate is ruptured in the fragile part that is extended in the front and rear direction of the vehicle and is rotated upward around the rear end of the seat section.

The impact absorbing plate is subsequently ruptured from the front part to rear part of the fragile part such that the impact absorbing plate is taken off upward around the rear end of the seat section. At this time, it is possible to simply and stably perform the control of the impact load only by managing dimension of the fragile part formed in the impact absorbing plate.

According to second, third and forth aspects of the invention, a cutoff part is formed at a front side of the impact absorbing plate, a convex part is provided at the inner side of the cutoff part so as to be attached to the front part of seat section, and a load supporting part that supports the load of the seat section is provided at the lower face of the convex part 35. With this configuration, the convex part can be prevented being transformed by the weight of seat section.

According to a fifth aspect of the invention, since a fragile part is a groove having the unequal sectional-area in which the sectional area is changed in the front and rear direction of the vehicle, when the impact absorbing plates are ruptured, it is possible to easily change the impact load. Since the impact load is changed, it is possible to maintain a necessary impact absorbing performance from the initial stage to the later stage of the rupture.

According to sixth and seventh aspects of the invention, a width of the groove having the unequal sectional-area becomes narrow toward the rear side of the vehicle, or the groove having the unequal sectional-area becomes shallow toward the rear side of the vehicle. Therefore, for example, it is possible to restrain the rapid rising of the impact load by easily generating the rupture of the impact absorbing plate at an initial stage of the rupture, and it is possible to restrain the lowering of the impact load by making the rupture of the impact absorbing plate not to occur easily at a later stage of the rupture.

Accordingly, it is possible to smoothly absorb the impact load.

According to an eighth aspect of the invention, since the stopper member for preventing the front part of the seat section from being raised to a prescribed height or higher is provided, it is possible to prevent the seat section from being rotated by a prescribed height or higher. Since the seat section is prevented from being rotated by a prescribed value or more, it is possible to restrain imbalance of the seat section due to the impact.

According to a ninth aspect of the invention, since the stopper member is made of the link mechanism that is folded when the impact is not generated and is elongated to restrain the following rising when the front end of the seat section rises to a prescribed height, when the impact is generated, the stopper member may be thinly configured. Since the stopper member can be thinly configured, the space required for the arrangement becomes small. Therefore, it is possible to restrain the expansion in the width of the seat.

According to a tenth aspect of the invention, the link mechanism is made of a plurality of link pieces and is provided with a resistance part serving as resistance when the plurality of the link pieces is elongated. Accordingly, the impact can be more absorbed by the resistance part, which is provided in the link mechanism, in addition to the impact absorbing plate.

BRIEF DESCRIPTION OF THE DRAWINGS

FIG. 8 is a view illustrating another embodiment of the impact absorbing plate according to the invention.

FIG. 9 is a view illustrating further another embodiment of the impact absorbing plate according to the invention.

FIG. 12 is an explanatory view and a functional view of a link mechanism.

DETAILED DESCRIPTION OF THE PREFERRED EMBODIMENTS

Hereinafter, a best mode for carrying out the invention will be described in conjunction with attached drawings. In drawings, terms "front", "rear", "up", "down", "left", and "right" indicate the directions as seen from an occupant who sat on the vehicle seat, respectively. Furthermore, the drawings are viewed in the direction of symbols.

Figure 1:
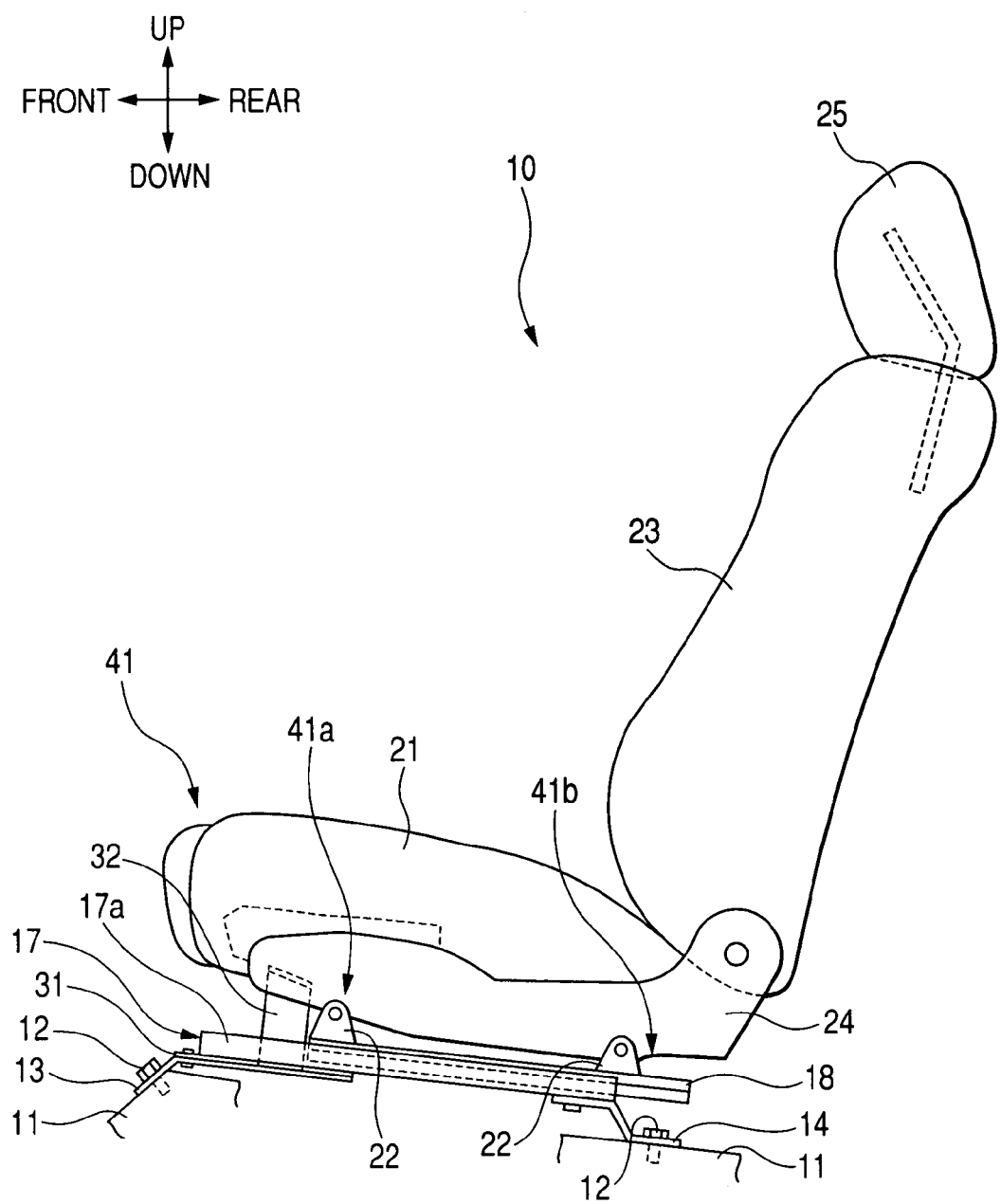
FIG. 1 is a side view of a vehicle seat according to the invention.

FIG. 1 is a side view of a vehicle seat according to the invention. A basic structure of the vehicle seat includes a front seat bracket 13 and a rear seat bracket 14 that are attached to a vehicle body 11 by fastening members 12 and 12, a rail 17 that is attached to the front seat bracket 13 and the rear seat bracket 14, a slider 18 that is slidably engaged with the rail 17, holding brackets 22 and 22 that is attached to a front end and a rear end of the slider 18, a plat-shaped side bracket 24 that is supported to the holding brackets 22 and 22, a seat section 21 that is supported from the side by the side bracket 24 and a backrest section 23. Reference numeral 25 denotes a headrest section.

An impact absorbing plate 31 is interposed between the front seat bracket 13 and the front end 17a of the rail 17. The impact absorbing plate 31 is a member for absorbing impact while being ruptured when an upward force of a specified level or higher is applied, and the detailed structure thereof will be described.

In addition, a stopper member 32 is attached to the front seat bracket 13 provided in the vehicle body 11 so as to prevent a following rising when the impact absorbing plate 31 is ruptured and the seat rises to a predetermined height.

Figure 2:
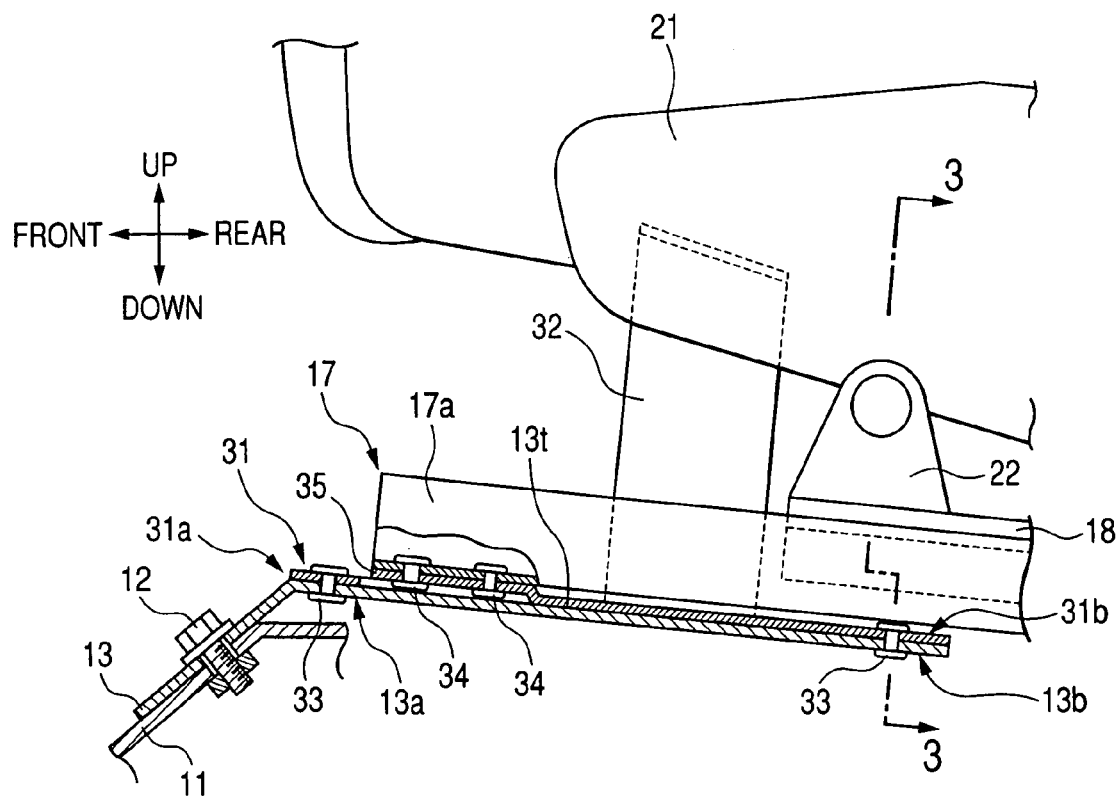
FIG. 2 is a cross sectional view illustrating a main part of the vehicle seat according to the invention.

FIG. 2 is a cross sectional view illustrating a main part of the vehicle seat according to the invention and illustrates an attachment structure of the impact absorbing plate 31 that is interposed between the rail 17 and the front seat bracket 13. The front seat bracket 13 is attached to the vehicle body 11 by the fastening member 12, and the impact absorbing plate 31 is disposed at an upper face 13t of the front seat bracket 13. A convex part 35 is formed at a front end 31a of the impact absorbing plate 31, and the front end 17a of the rail 17 is attached to the convex part 35.

The impact absorbing plate 31 is fixed to a front part 13a and a rear part 13b of the front seat bracket 13 attached to the vehicle body 11 by rivets 33 and 33, and the front end 17a of the rail 17 is attached to the convex part 35 formed at the front end 31a of the impact absorbing plate 31 by rivets 34 and 34.

That is, the front end 31a and the rear end 31b of the impact absorbing plate 31 is connected to the vehicle body 11 through the rivets 33 and 33, and the convex part 35 formed at a front part 31z of the impact absorbing plate 31 is connected to the front end 17a of the rail 17 through the rivets 34 and 34.

Figure 3:
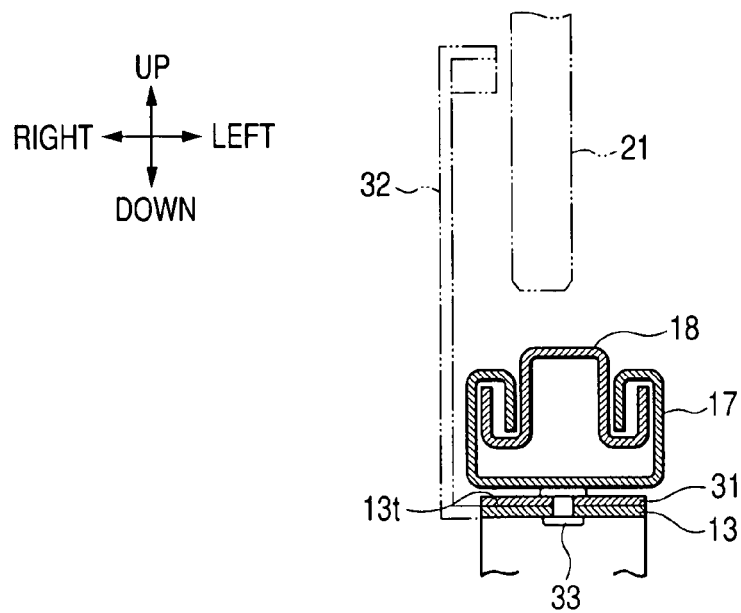
FIG. 3 is a cross sectional view taken along a line 3-3 of FIG. 2.

FIG. 3 is a cross sectional view taken along a line 3-3 of FIG. 2. In FIG. 3, the impact absorbing plate 31 is attached to an upper face 13t of the front seat bracket 13 by the rivet 33, the rail 17 is disposed on the impact absorbing plate 31, and the slider 18 is engaged with the rail 17.

The seat section (reference numeral 21 in FIG. 1) attached to the slider 18 and the backrest (reference numeral 23 in FIG. 1) are configured so as to adjust a position by the rail 17 and the slider, which is engaged with the rail 17, in the front and rear direction of the vehicle.

Figure 4:
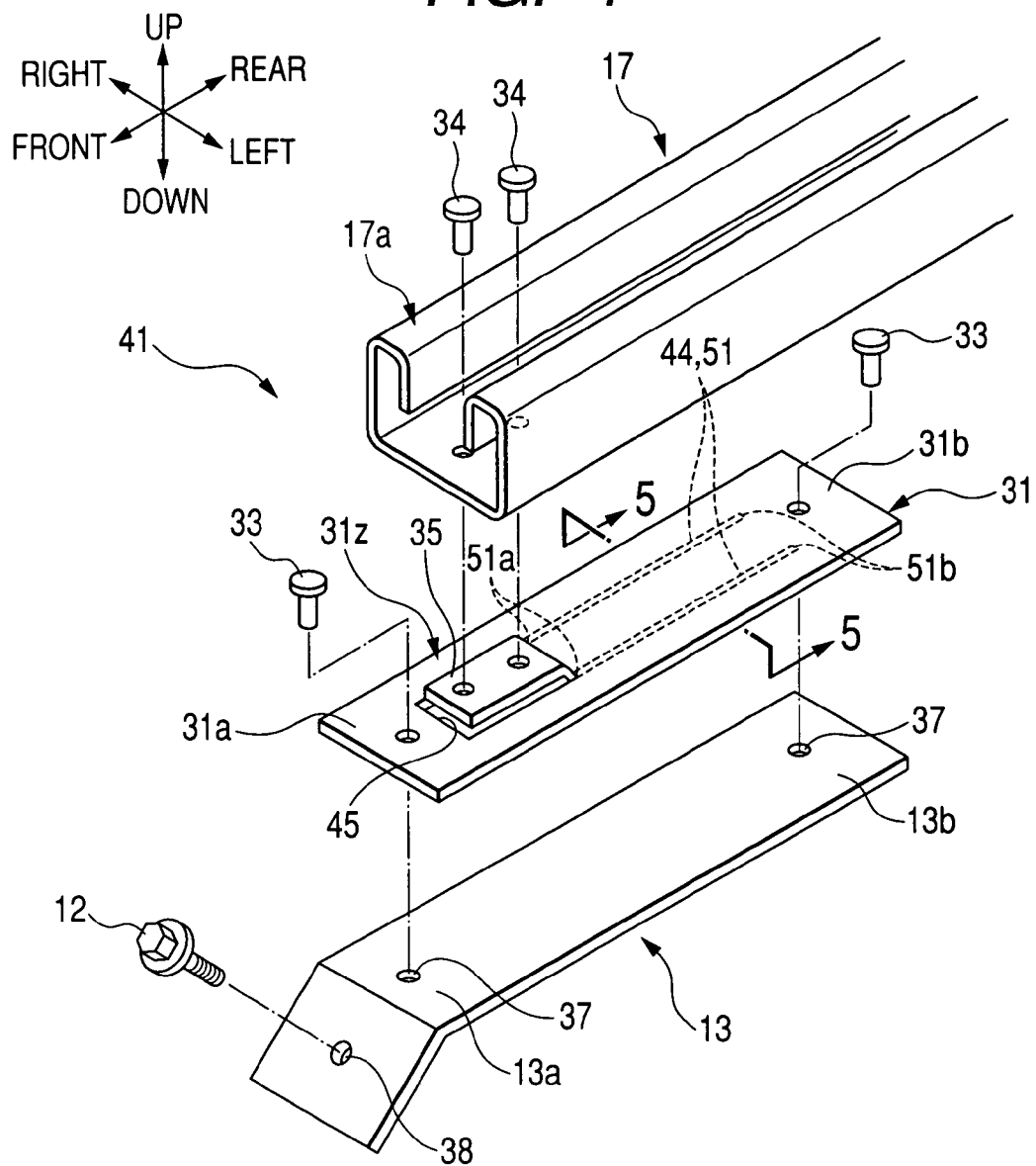
FIG. 4 is an exploded perspective view explaining the attachment structure of the impact absorbing plate according to the invention.

FIG. 4 is an exploded perspective view explaining the attachment structure of the impact absorbing plate according to the invention. The impact absorbing plate 31 is provided such that rupture generating parts 44 and 44 ruptured by the impact are extended in the front and rear direction of the vehicle. Furthermore, the impact absorbing plate 31 is fixed to a front part 13z of the front seat bracket 13 by the rivets 34 and 34.

A cutoff part 45 is formed at a rear side of the rivet 33 provided in the front end 31a of the impact absorbing plate 31, and the convex part 35 is formed by expanding upwardly an inner side of the cutoff part 45. The front end 17a of the rail 17 is attached to the convex part 35 by the rivets 34 and 34.

In addition, reference numerals 37 and 37 denote rivet holes, and numeral 38 denotes a fastening hole.

The impact absorbing plate 31 has a fragile part 51 for extending in the front and rear direction of the vehicle. The read end 31b of this impact absorbing plate 31 is connected to the front seat bracket 13 provided in the vehicle body 11, and the convex part 35 formed at the front part 31z of the impact absorbing plate 31 is connected to the rail 17 that is one component of a seat section 41.

Figure 5:
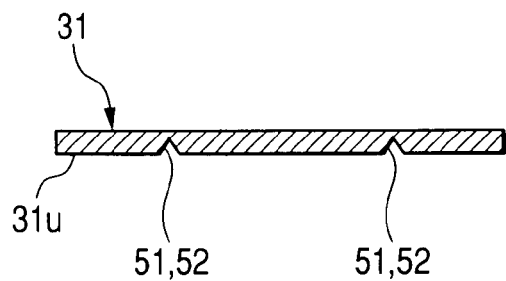
FIG. 5 is a cross sectional view taken along a line 5-5 of FIG. 4.

FIG. 5 is a cross sectional view taken along a line 5-5 of FIG. 4 and illustrates an example for forming grooves 52 and 52 serving as a fragile part 51 at a lower face 31u of the impact absorbing plate 31. When the impact load is applied, since a part held between the grooves 52 and 52 is ruptured so as to be taken off toward the upper part of FIG. 5, the impact absorbing plate 31 absorbs impact energy.

Back to FIG. 1, when assuming the rail 17, the slider 18, the seat section 21, the holding brackets 22 and 22 and the grooves 52 and 52 as a seat section 41, the vehicle seat 10 is connected to the vehicle body 11 in which a rear end 41b of the seat section 41 can be rotated. At this time, a front end 41a of the seat section 41 is possible to be connected to the vehicle body 11 through the impact absorbing plate 31 for absorbing the impact while being ruptured when an upward force of a specified level or higher is applied.

An operation of the above-mentioned vehicle seat will be described now.

FIG. 6 is an explanatory view illustrating an operation of the vehicle seat.

Figure 6A:
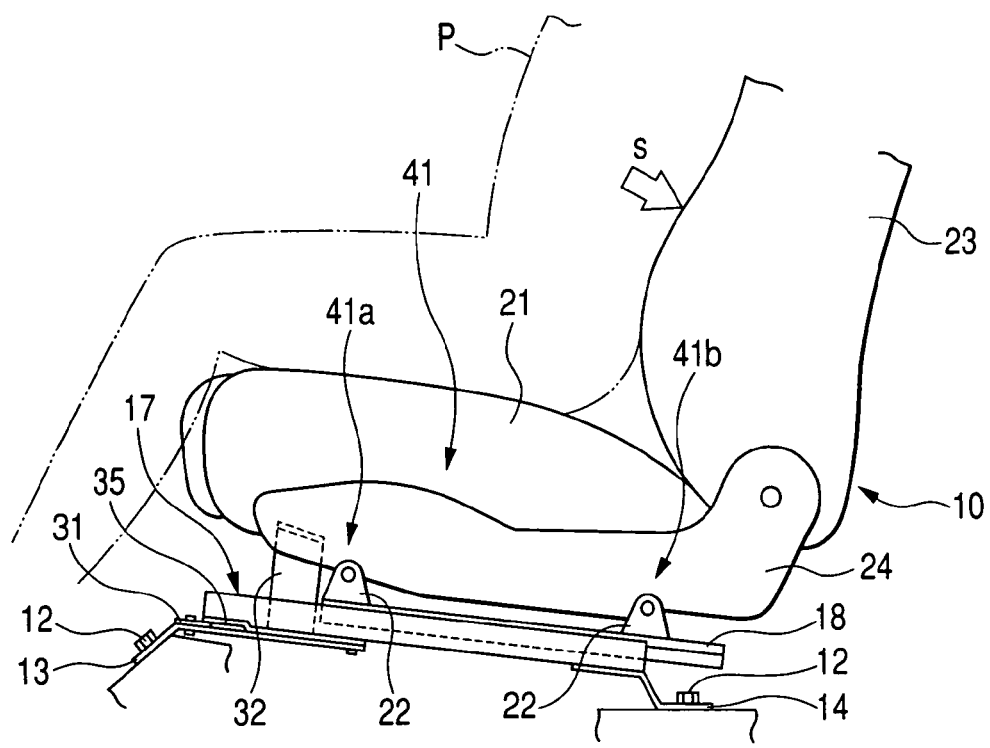
FIG. 6 is an explanatory view illustrating an operation of the vehicle seat.

In FIG. 6a, when the occupant P receives the impact from the rear side, the force is applied to the backrest part 23 by inertia in the direction of arrow s, thereby the vehicle seat 10 is moved toward the rear side.

Figure 6B:
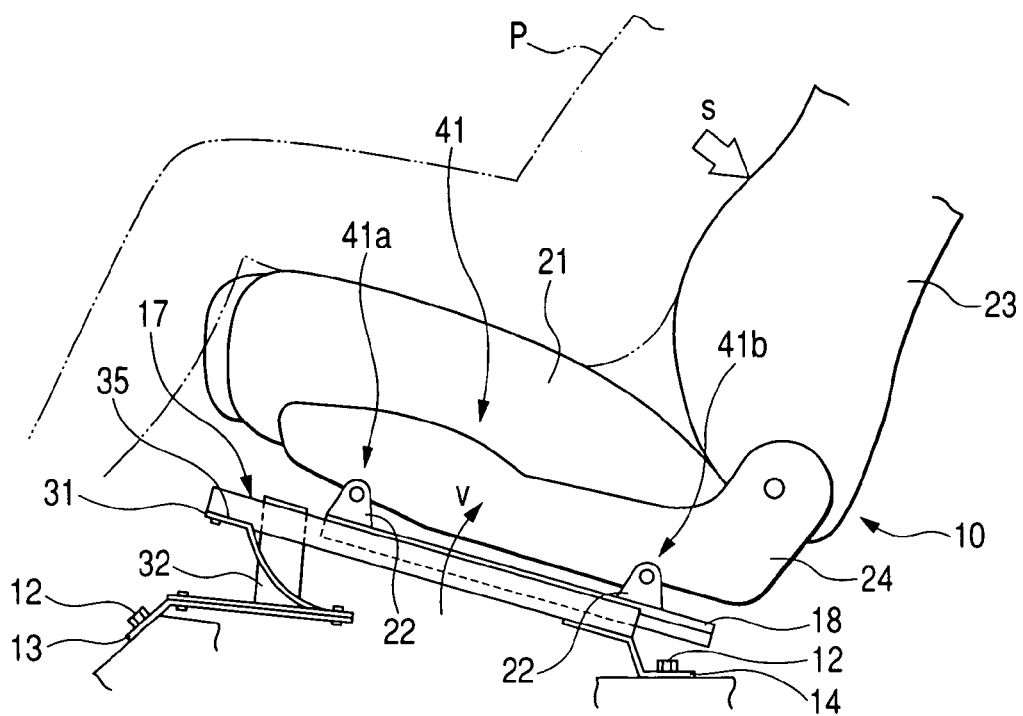

In FIG. 6b, when the impact load of a prescribed value or higher is applied, the convex part 35 formed at the front part of the fragile part (reference numeral 51 in FIG. 4) that is provided in the above-mentioned impact absorbing plate 31 to be extended in the front and rear direction of the vehicle is raised by the rail 17, thereby the rupture is generated from the front part of the impact absorbing plate 31.

Accordingly, the impact absorbing plate 31 is configured such that when the vehicle seat 10 receives the impact, the impact absorbing plate 31 is ruptured in the fragile part (reference numeral 51 in FIG. 4) that is extended in the front and rear direction of the vehicle, and the front end 41a of the seat section 41 is rotated around the rear end 41b of the seat section 41 serving as a supporting point in the direction of arrow v of FIG. 6.

Back to FIG. 4, since the impact absorbing plate 31 is ruptured such that the fragile part 51 is subsequently taken off from the front end 51a to rear end 51b, the impact absorbing plate 31 can be stably ruptured. It is possible to simply and stably perform the control of the impact load only by managing dimension of the fragile part 51 formed in the impact absorbing plate 31.

Back to FIG. 6, since the stopper member 32 for preventing the front part 41a of the seat section 41 from being raised to a prescribed height or higher is provided, it is possible to prevent the seat section 41 from being rotated by a prescribed height or higher. Since the seat section 41 is prevented from being rotated by a prescribed value or more, it is possible to restrain imbalance of the seat section 41 due to the impact.

Figure 7:
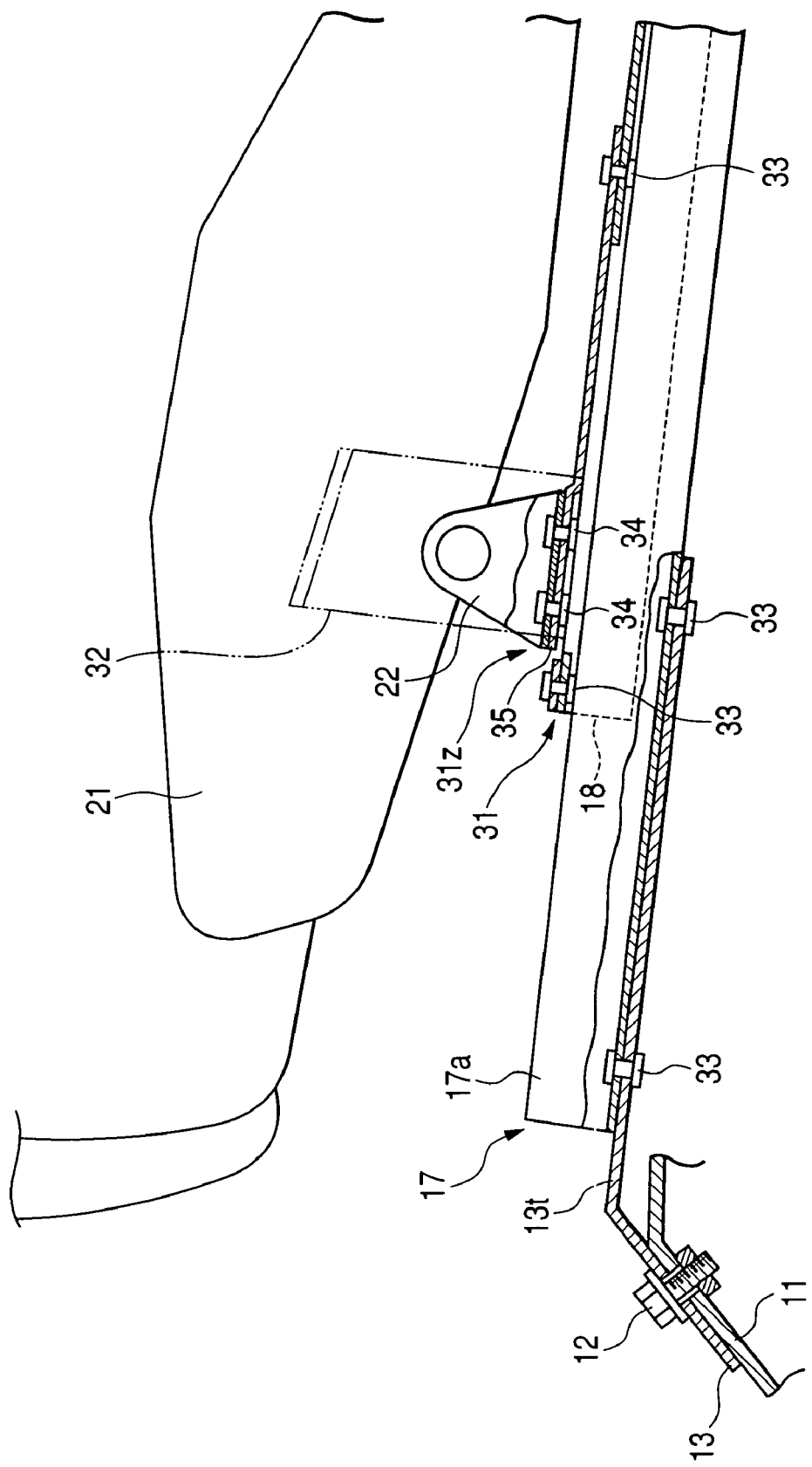
FIG. 7 is view illustrating another embodiment of FIG. 2.

FIG. 7 is a view illustrating another embodiment of FIG. 2. In FIG. 7, the front seat bracket 13 is attached to the vehicle body 11 by the fastening member 12, the front end 17a of the rail 17 is attached to the upper face 13t of the front seat bracket 13 by the rivets 33 and 33, the impact absorbing plate 31 is disposed in the slider engaged with the rail 17, and the holding bracket 22 is attached to the convex part 35 formed at the front part 31z of the impact absorbing plate 31 by the rivets 34 and 34.

FIG. 7 is different from FIG. 2 in that the front seat bracket 13 and the rail 17 is fixed to the vehicle body 11, and the impact absorbing plate 31 is provided between the holding brackets 22 and 22 provided at the seat side and the slider 18.

With the above-mentioned structure, it is possible to obtain preferred stable impact absorbing characteristics by coming close the backrest 23 to the fragile 51 of the impact absorbing plate 31, regardless of slide position of the seat.

FIG. 8 is a view illustrating another embodiment of the impact absorbing plate according to the invention. A point different from the above-mentioned embodiment is to form grooves in which that a sectional area of two grooves 52 and 52 formed in the front and rear direction of the vehicle is gradually changed across the front and rear of an impact absorbing plate 31B.

FIG. 8A is a perspective view of the impact absorbing plate including the grooves in which the sectional area is changed, FIG. 8B is a cross sectional view taken along b part of FIG. 8A, and FIG. 8C is a cross sectional view taken along c part of FIG. 8A.

In FIGS. 8B and 8C, the relation between the plate thicknesses Tb and Tc of the fragile part satisfies Tb<Tc. Here, Tb and Tc are the plate thicknesses of the fragile part that subtracts the depth of the groove 52B from the plate thickness T of the impact absorbing plate 31B.

For example, it is possible to restrain the rapid rising of the impact load by easily generating the rupture of the impact absorbing plate 31 at an initial stage of the rupture, and it is possible to restrain the lowering of the impact load by making the rupture of the impact absorbing plate 31 not to occur easily at a later stage of the rupture.

Therefore, it is possible to smoothly absorb the impact load.

FIG. 9 is a view illustrating further another embodiment of the impact absorbing plate according to the invention. A groove 53 having an unequal sectional-area is a tapered groove 54 in which the width gradually narrows toward the rear side of the vehicle.

FIG. 9A is a perspective view of the impact absorbing plate including the grooves in which the sectional area is changed, FIG. 9B is a cross sectional view taken along b part of FIG. 9A, and FIG. 9C is a cross sectional view taken along c part of FIG. 9A.

In FIGS. 9B and 9C, the relation between the widths Wb and Wc of the grooves 52 and 52 of the impact absorbing plate 31C having a plate thickness T satisfies Wc<Wb.

Since the groove 53 having the unequal sectional-area is the tapered groove 54 in which the width gradually narrows toward the rear side of the vehicle, as the rupture advances, the plate thickness near the fragile part becomes thinner and the energy required for the rupture increases. Accordingly, it is possible to heighten the impact load.

For this reason, for example, it is possible to restrain the rapid rising of the impact load by easily generating the rupture of the impact absorbing plate 31C at an initial stage of the rupture, and it is possible to restrain the lowering of the impact load by making the rupture of the impact absorbing plate 31C not to occur easily at a later stage of the rupture.

Therefore, it is possible to smoothly absorb the impact load.

That is, since the fragile part 51 is the groove 53 having the unequal sectional-area in which the sectional area is changed in the front and rear direction of the vehicle, when the impact absorbing plates 31B and 31C are ruptured, it is possible to easily change the impact load. Since the impact load is changed, it is possible to maintain a necessary impact absorbing performance from the initial stage to the later stage of the rupture.

Figure 10A:
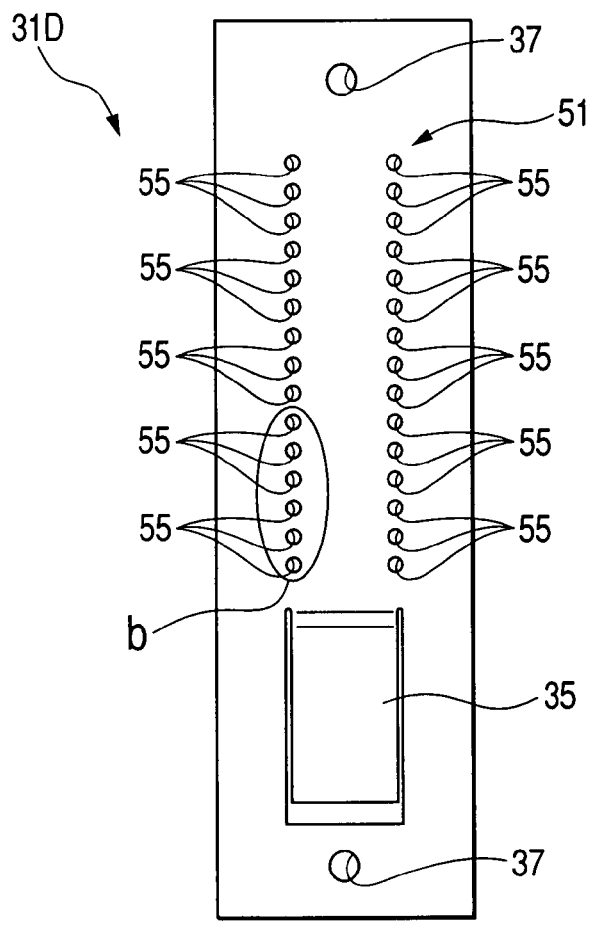
FIG. 10 is a modified view of the impact absorbing plate according to the invention.

FIG. 10 is a modified view of the impact absorbing plate according to the invention, and FIG. 10A is a plan view of an impact absorbing plate 31D including the fragile part 51 formed with a number of through holes 55 that are disposed in a line.

Figure 10B:
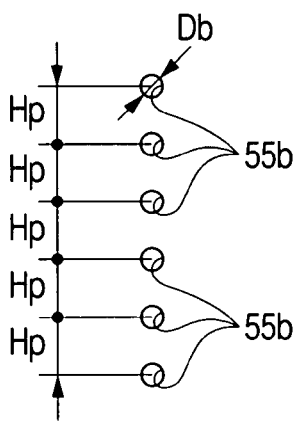

FIG. 10B is an enlarged view of b-part of FIG. 10A. In FIG. 10B, the diameter of the through holes is Db, and the pitch between centers of each through hole is Hp.

Figure 10C:
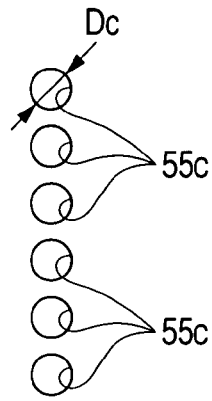

FIG. 10C is a view illustrating a modified example of FIG. 10B. In FIG. 10C, the pitch between centers of each through hole is the same Hp as in FIG. 10B, and the diameter of the through holes 55 is represented by DC (Db<Dc) and is larger than that of FIG. 10B.

Figure 10D:
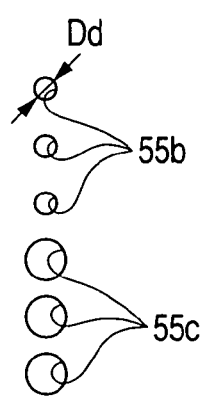

FIG. 10D is a view illustrating another modified example of FIG. 10B. In FIG. 10D, the pitch between centers of each of the through holes 55b and 55c is the same Hp as in FIG. 10B, and the through holes 55b and 55c having different diameters are disposed.

In addition, the diameter and arrangement of each through hole can arbitrarily set.

FIG. 11 is a perspective view of the impact absorbing plate according to another embodiment of the invention.

Figure 11A:
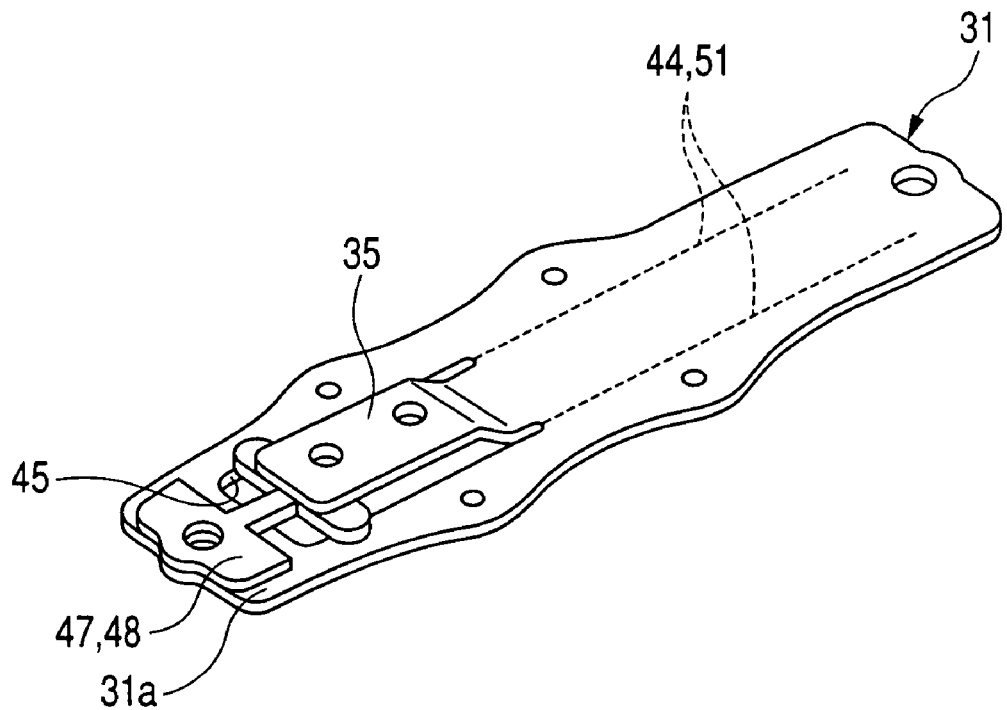
FIG. 11 is a perspective view of the impact absorbing plate according to another embodiment of the invention.

In FIG. 11A, the cutoff part 45 is formed at the front part of the impact absorbing plate 31, the convex part 35 attached to the front end of the seat section (reference numeral 41 of FIG. 1) is provided at the inner side of the cutoff part 45, and a load supporting part 47 that supports the load of the seat section 41 is attached to the lower face of the convex part 35. Specifically, the load supporting part 47 is attached to the front end 31a of the impact absorbing plate 31 and is a load supporting member 48 that is provided so as to be extended toward the rear side.

The convex part 35 for attaching the front end of the seat section (reference numeral 41 of FIG. 1) is provided at the front part of the impact absorbing plate 31, and the load supporting part 47 that supports the load of the seat section 41 is provided at the lower face of the convex part 35. With this configuration, the convex part 35 can be prevented being transformed by the weight of seat section 41 when the impact is not generated.

Figure 11B:
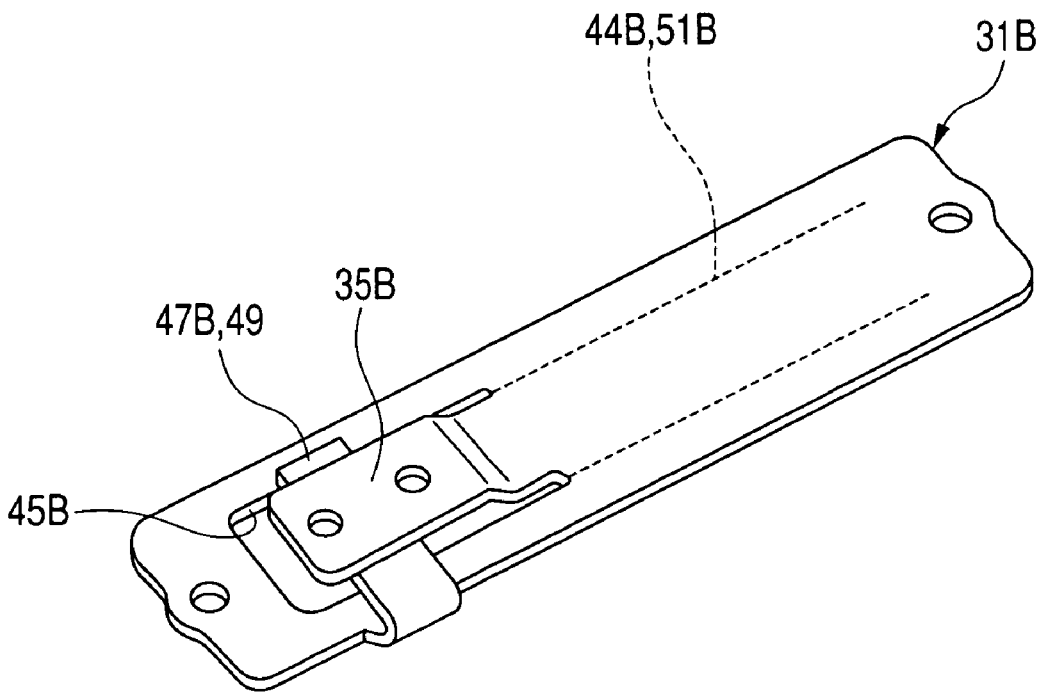
Figure 13:
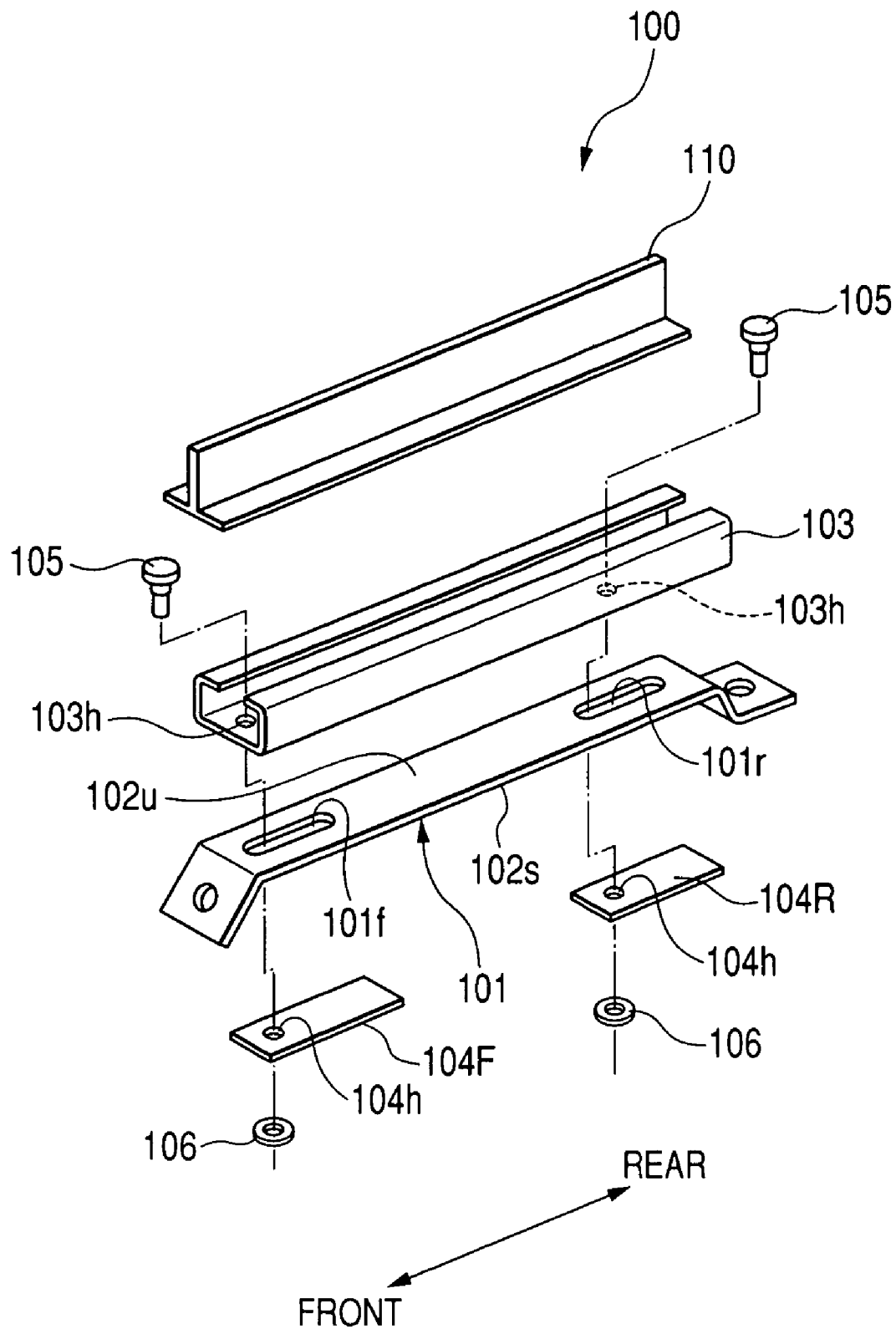
FIG. 13 is a view explaining a basic structure of the related art vehicle seat.

In FIG. 11B, a load supporting part 47B is to fold an extension part 49 in which the side of the impact absorbing plate 31A is partially extended, and the load supporting part 47B is formed by slipping down the lower face of the convex part 35B.

The convex part 35B for attaching the front end of the seat section (reference numeral 41 of FIG. 1) is provided at the front part of the impact absorbing plate 31B, and the load supporting part 47B is provided at the lower face of the convex part 35B. With this configuration, the convex part 35B can be prevented being transformed by the weight of seat section 41 when the impact is not generated.

FIG. 12 is an explanatory view and a functional view of a link mechanism. The link mechanism 60 is folded when using it usually and is elongated to restrain the following rising when the front end 41a of the seat section 41 rises to a prescribed height, when the impact is generated. The link mechanism 60 is interposed between the vehicle body and the seat section.

The link mechanism 60 includes a first pin 61 attached to the vehicle body, a first link piece 62 provided rotatably in the first pin 61, a second link piece 64 provided in the first link piece 62 though a second pin 63, and a third pin 65 attached between the second link piece 64 and the rail 17 constituting a part of the seat section 41.

In addition, a min-convex part 66 is provided at the surface in which the first link piece 62 faces the second link piece 64. The mini-convex part 66 serves as a resistance part that is provided so as to protrude each of the link pieces 62 and 64 toward the link piece of the other side. The mini-convex parts 66 and 66 provided in the first and second link pieces 62 and 64 are engaged with each other and are resisted in the direction where the first and second link pieces 62 and 64 are unlinked.

That is, the link mechanism 60 is made of a plurality of link pieces 62 and 64 and is provided with the resistance part 70 serving as resistance when the plurality of the link pieces 62 and 64 are elongated.

In FIG. 12A, when the occupant P receives the impact from the rear side, the force is applied to the backrest part 23 by inertia in the direction of arrow s, thereby the vehicle seat 10 is moved toward the rear side.

In FIG. 12B, when the impact load of a prescribed value or higher is applied, the convex part (reference numeral 35 in FIG. 4) formed at the front part of the above-mentioned fragile part (reference numeral 51 in FIG. 4) is raised by the rail 17, thereby the rupture is generated at the impact absorbing plate 31. At this time, the folded link mechanism 60 is elongated in FIG. 12A.

FIG. 12C illustrates the state when the elongation of the link mechanism 60 is finished.

Here, since the min-convex parts 66 and 66 are provided at the surface in which the first link piece 62 faces the second link piece 64 such that the min-convex parts 66 and 65 are engaged with each other, when the second link piece 64 is separated from the first link piece 62, that is, when the state of FIG. 12A is shifted to the state of FIG. 12C, the resistance can be generated by the mini-convex parts 66 and 66 that are provided in each of the link pieces 62 and 64, respectively.

Accordingly, the impact can be absorbed by the mini-convex parts 66 and 66 serving as the resistance part 70, which is provided in the link mechanism 60, in addition to the impact absorbing plate 31.

Since the stopper member 32 is made of the link mechanism 60 that is folded when the impact is not generated and is elongated to restrain the following rising when the front end of the seat section 21 rises to a prescribed height, when the impact is generated, the stopper member 32 may be thinly configured. Since the stopper member 32 can be thinly configured, the space required for the arrangement becomes small. Therefore, it is possible to restrain the expansion in the width of the seat.

In addition, it is described that the mini-convex parts serving as the resistance part are provided in each of the link pieces. However, for example, a spring may be provided in the third pin 65. The spring urges toward the direction that resist when the plurality of the first and second link pieces are elongated.

A vehicle seat according to the invention is suitable for four-wheel vehicle.

What is claimed is:

1. A vehicle seat for a vehicle having a vehicle body, comprising:
    a seat section, and
    an impact absorbing plate that absorbs impact while being ruptured, when an upward force of a specified level or higher is applied to the seat section,
    the impact absorbing plate includes a fragile part that is extended in the front and rear direction of the vehicle, and is provided at a lower part in a front end of the seat section,
    a rear part of the impact absorbing plate is connected to the vehicle body,
    a front part of the impact absorbing plate is connected to the front end of the seat section,
    the impact absorbing plate includes two fragile parts that are approximately in parallel with each other,
    a cutoff part continuous with the fragile parts is formed at a front end of the fragile parts,
    a convex part is formed at an upper side of the cutoff part, and
    the convex part is connected to the seat section.

2. The vehicle seat according to claim 1, further comprising:
    a load supporting part for supporting load of the seat section provided at a lower side of the convex part.

3. The vehicle seat according to claim 1, wherein
    the fragile part is a groove having an unequal sectional-area varying in the front and rear direction of the vehicle.

4. The vehicle seat according to claim 3, wherein
    a width of the groove having the unequal sectional-area becomes narrow toward the rear side of the vehicle.

5. The vehicle seat according to claim 3, wherein
    the groove having the unequal sectional-area becomes shallow toward the rear side of the vehicle.

6. The vehicle seat according to claim 1, further comprising:
    a stopper member to prevent the front end of the seat section from rising higher than a predetermined height.

7. The vehicle seat according to claim 6, wherein
    the stopper member is a link mechanism that is folded, when the impact is not generated.

8. The vehicle seat according to claim 7, wherein
    the link mechanism includes a plurality of link pieces and is provided with a resistance part serving as resistance when the plurality of the link pieces is elongated.

9. The vehicle seat according to claim 1, wherein
    the fragile part is provided at a lower side of the impact absorbing plate.

10. The vehicle seat according to claim 1, wherein
    the fragile part is made of a plurality of concave parts that are extended in the front and rear direction to be linearly disposed.

11. The vehicle seat according to claim 1, wherein
    a site between two fragile parts, which are approximately in parallel with each other, in the impact absorbing plate is connected to the front end of the seat section, and
    a front side and a rear side of the fragile parts are connected to the vehicle body.

12. The vehicle seat according to claim 1, wherein the seat section comprises a rail section and a slider configured to slide within the rail section, and wherein the convex part attaches to a lower surface of a front portion of the rail section.

13. The vehicle seat according to claim 1, wherein the vehicle body comprises a rail section and a slider configured to slide within the rail section, and wherein the rear part of the impact absorbing plate is connected to an upper surface of a rear portion of the slider.

14. The vehicle seat according to claim 1, wherein the fragile part comprise a plurality of linearly arranged through-holes.

* * * * *